(12) United States Patent
Robinson

(10) Patent No.: US 6,972,558 B1
(45) Date of Patent: Dec. 6, 2005

(54) MAGNETIC SENSOR SYSTEM

(75) Inventor: Ben Robinson, Norwich (GB)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 11/009,748

(22) Filed: Dec. 13, 2004

(30) Foreign Application Priority Data

Aug. 16, 2004 (EP) ................... 04254917

(51) Int. Cl.$^7$ ............................................. G01B 7/30
(52) U.S. Cl. ............................ 324/207.22; 324/207.2; 324/207.21; 324/207.25
(58) Field of Search ............ 324/207.11, 207.13, 324/207.2, 207.21–207.26, 244, 251, 259–261; 338/32 H

(56) References Cited

U.S. PATENT DOCUMENTS

| | | | |
|---|---|---|---|
| 5,231,508 A | 7/1993 | Murphy, Jr. | |
| 5,374,790 A | 12/1994 | Horvath | |
| 5,410,913 A | 5/1995 | Blackburn | |
| 5,426,271 A | 6/1995 | Clark et al. | |
| 6,230,561 B1 | 5/2001 | Li | |
| 6,396,259 B1 * | 5/2002 | Washeleski et al. | ... 324/207.22 |
| 6,508,119 B2 | 1/2003 | Beck, II | |
| 6,508,121 B2 | 1/2003 | Eck | |
| 6,518,749 B1 | 2/2003 | Oudet et al. | |
| 6,578,417 B1 | 6/2003 | Eck | |
| 6,593,734 B1 | 7/2003 | Gandel et al. | |
| 2003/0084720 A1 | 5/2003 | Ross, Jr. | |
| 2003/0112003 A1 * | 6/2003 | Pfaffenberger et al. | .. 324/207.2 |
| 2004/0182150 A1 * | 9/2004 | Okada et al. | ................. 73/313 |
| 2004/0231416 A1 * | 11/2004 | Kumagai | ..................... 73/313 |

FOREIGN PATENT DOCUMENTS

| | | |
|---|---|---|
| EP | 0 950 878 A | 10/1999 |
| EP | 1479555 A1 | 11/2004 |
| GB | 1 172 127 A | 11/1969 |
| JP | 02-227615 | 9/1990 |
| JP | 07-260614 | 10/1995 |
| JP | 11287696 | 10/1999 |
| JP | 2001242002 | 9/2001 |
| JP | 2003075237 | 3/2003 |
| JP | 2003222551 | 8/2003 |

(Continued)

OTHER PUBLICATIONS

Post, Richard F., "A New Look at an Old Idea, The Electrochemical Battery", Science & Technology Review, Apr. 1996, pp. 12-19.

(Continued)

Primary Examiner—Bot LeDynh
(74) Attorney, Agent, or Firm—Lonnie Drayer; David King

(57) ABSTRACT

A magnetic sensor assembly measures changes in the position of a lever arm. The magnetic sensor assembly has a support. A lever arm can pivot about an axis of rotation or a pivot point and is attached to the support at a first end of the lever arm. A magnet produces a magnetic field adjacent the first end of the lever arm and is fixed to rotate in a predetermined arc about the pivot point or axis of rotation in response to a pivotal movement of the lever arm. A magnetic sensor is positioned in proximity to the magnet to detect changes in the magnetic field due to rotation of the magnet along a predetermined arc. Preferably the predetermined arc has a constant radius of curvature forming at least a portion of a circular arc. The magnetic sensor assembly preferably employs a magnet that is at least arcuate in shape more preferably the magnet is annular or penannular forming a ring.

8 Claims, 6 Drawing Sheets

FOREIGN PATENT DOCUMENTS

WO          WO 88/01046 A     2/1998

OTHER PUBLICATIONS

Von Burg, Peter et al., "Design of an electrical machine with integrated flywheel", 15th Electric Vehicle Symposium EVS-15, Brussels, Belgium, Oct. 98, can be found at http://www.aspes.ch/publications/EVS-15_Paper.pdf.

http://www.aspes.ch/publications/EVS-15_Paper.pdf.
Sullivan, Charles R. et al., "Thin-Film Inductor Designs and Materials for High-Current Low-Voltage Power", 2nd International.
Symposium on High-Frequency Micromagnetic Devices and Materials, 2003, can be found at http://thayer.dartmouth.edu/other/inductor/papers/overview.pdf.

\* cited by examiner

LEFT SIDE: TOP VIEW OF NORMAL MAGNETIC CIRCUIT GEOMETRY. MAGNET, STEEL RING & HALL SENSOR IC.

RIGHT SIDE: MAGNETIC FLUX PLOT OF SENSOR ASSEMBLY.

DESIGN-3
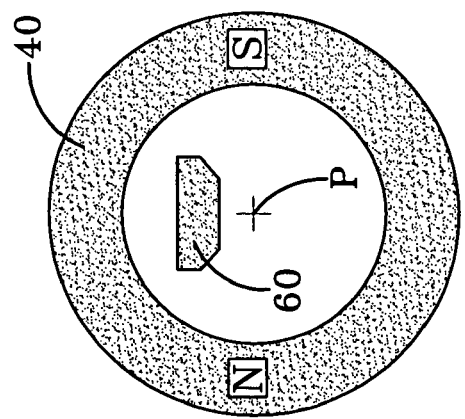
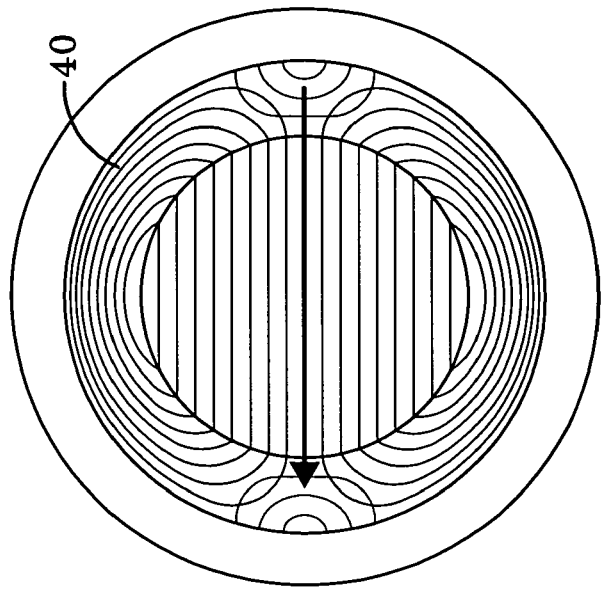
LEFT SIDE: TOP VIEW OF NORMAL MAGNETIC CIRCUIT GEOMETRY. MAGNET, STEEL RING & HALL SENSOR IC.
RIGHT SIDE: MAGNETIC FLUX PLOT OF SENSOR ASSEMBLY.
FIG-3C

MAGNETIC SENSOR SYSTEM

FIELD OF THE INVENTION

The current invention relates to non-contacting sensor systems having the ability to detect changes in magnetic fields due to rotational movement of a magnet.

BACKGROUND OF THE INVENTION

Many devices require accurate measurement sensors to calculate speed, acceleration or volume. These calculated values are transmitted to gauges or to a computer microprocessor to either give a visual readout of the measured value or to input the computer program to direct a change in condition or to activate another mechanical device.

Typically many such sensors are found in vehicles such as automobiles, trucks and the like. A condition such as vehicle speed is shown via a speedometer gauge on the instrument panel. The driver visually observes the speed indication and can adjust the speed accordingly by adjusting the pressure applied to the foot pedal or accelerator throttle. Another application for sensors is in measuring the fluid or fuel level in the fuel tank. Again a signal is sent from the fuel tank sensor to the instrument gauge to alert the driver to the amount of fuel he or she has remaining in the tank. Both the accelerator foot throttle and the fuel tank systems employ a lever that pivots about a pivot point or an axis of rotation.

Historically, the foot throttle was connected to the engine carburetor of an internal combustion engine via a throttle cable that moved valve to increase fuel flow to the engine as the driver depressed the foot pedal. New more advanced vehicles are starting to employ hybrid engines using a combination of electric and gasoline power wherein initial acceleration may be achieved via electric motors at the wheel position. Furthermore, new technology has made it likely the use of mechanical wires can be avoided altogether whereby sensors will relay required responses to a microprocessor which in turn inputs the engine or electric motors to respond. When such "drive by wire" or wireless systems are employed it is essential the sensors driving the input signal are fail safe, reliable, and virtually capable of unlimited duty cycles.

DISCUSSION OF THE PRIOR ART

Vehicle fuel tanks commonly use resistive track technology for measuring the fuel level. This problem of such sensors was pointed out in U.S. Pat. No. 6,578,417 B1 by Karl Eck of Germany. In that patent Mr. Eck describes the present state of vehicle fuel tank design as follows: "Lever-type fill level transmitters having a lever arm with a float fixed thereto are often used in fuel tanks and are known. The known lever-type transmitters are typically fixed to a structural part in the fuel tank, e.g. a conveying unit. The known lever-type transmitter further comprises a support part on which a ceramic with a thick-film resistor network is arranged. A sliding-action contact connected to the lever arm sweeps over the resistor network to generate an electrical signal corresponding to the filling level dependent on the pivot movement. The disadvantage of these lever-type transmitters is that the resistor network is arranged in the fuel and, consequently, has to be resistant to said fuel. Furthermore, the sliding-action contact is subject to wear. Moreover, these known lever-type transmitters do not have diagnosis capability. That is, changes in the measured values caused by deposits or similar effects cannot be identified. Accordingly, these changes in measured values over time cause the output signal to deviate so that it no longer corresponds to the actual filling level.

To avoid corrosion and wear on the sensor of the lever-type transmitter, it is known to use sensors that operate without contact such as, for example, reed contacts for filling level measurement. In a fill level transmitter having reed contacts, one or more reed contacts are arranged as part of an evaluation circuit in the liquid container and a float bearing a magnet is arranged in a movable manner along the reed contacts. The reed contact located proximate to the float is closed via the magnetic field of the magnet. A corresponding electrical signal is obtained by the evaluation circuit at this reed contact that corresponds to the respective filling level. A problem with filling level sensors of this type is that they require a complicated configuration because plural sensors must be arranged in a distributed manner over the entire height of the liquid container. The arrangement of plural sensors requires a relatively large volume which has a negative effect on the remaining useful volume of the container."

Mr. Ecks' solution to the fuel tank fill level sensor was to place the sensor external of the fuel tank and to use a magnet which moved in a linear fashion by a cam disk connected to a lever arm, but offset relative to the pivot axis of the lever arm wherein the cam disk can reflect the linearity of the tank and movement of the cam disk would result in the magnet moving linearly relative to the magnetic sensor. Mr. Eck further noted the offset cam disk may be a magnet so that instantaneous readings of the tank can be made as the tank is filled.

A key drawback of the Eck sensor system is that the sensor had to be remotely positioned external to the fuel tank which means that the magnetic device if placed inside the tank would transmit changes in field intensity through an enclosure which could itself limit the passing of the magnetic field due to deposits or chemical build ups on the surface of the sensor housing. Another critical issue was the lack of shielding and the clear need to shield the sensor from electromagnetic fields (EMF) or electromagnetic interference (EMI) noise that effectively interferes with the reading of changes in the magnetic field due to movements of the magnet. A final and especially important negative consideration was one of simple cost added by cams and cam drivers and cam follower and sensor housings shown in the Eck patent which add cost to the vehicle.

SUMMARY OF THE INVENTION

The present invention greatly simplifies the complexities and costs associated with the sensor such as Eck described in U.S. Pat. No. 6,578,417 B1 in that the use of a cam disk can be avoided completely. Furthermore, the entire sensor mechanism can be internal to a fuel tank if so desired. The present invention simplifies configuration of the magnetic device and improves its mounting in the sensor assembly. The present invention provides a non-contacting sensor system that is universally adaptable to present devices employing lever arms that are pivotably movable such as are currently employed in fuel tanks and foot pedal throttles. The new sensor is highly reliable with improved accuracy and inherently better EMF and EMI shielding.

A magnetic sensor assembly for measuring changes in position of a lever arm is disclosed. The magnetic sensor assembly has: a support; a lever arm pivotably movable about an axis of rotation or a pivot point and attached to the support at a first end of the lever arm; a magnet producing a magnetic field adjacent the first end of the lever arm and fixed to rotate in a predetermined arc about the pivot point or axis of rotation in response to a pivotal movement of the lever arm; and a magnetic sensor positioned in proximity to the magnet detects changes in the magnetic field due to rotation of the magnet along a predetermined arc. Preferably the predetermined arc has a constant radius of curvature forming at least a portion of a circular arc. The magnetic sensor assembly preferably employs a magnet that is at least arcuate in shape more preferably the magnet is annular or penannular forming a ring.

The magnetic sensor preferably is a Hall element. The Hall element is a passive type magnetic sensor. The magnetic sensor is preferably positioned internal relative to the arc radius of curvature of the magnet The magnet preferably is bipolar and has a magnetic sensor positioned approximately equidistant to the poles in the null position.

The magnetic sensor assembly when used in a fuel tank preferably includes a float attached to the opposite end of the lever arm and wherein the magnetic sensor assembly is capable of fluid measuring for the fluid storage tank.

The magnetic sensor assembly can also be used as an accelerator throttle pedal measuring device wherein the magnetic sensor assembly measures the position of the pivotable movement of the accelerator throttle pedal to control vehicle acceleration.

BRIEF DESCRIPTION OF THE DRAWINGS

FIG. 1A is a view of the first embodiment of the invention showing the magnet and the magnetic sensor taken from FIG. 1.

FIG. 3C is a third embodiment of the invention wherein the magnetic sensor is positioned internal of the annular magnetic magnet.

DETAILED DESCRIPTION OF THE INVENTION

As used herein and in the claims a Hall Element is understood to be a passive magnetic sensor type capable of detecting changes in magnetic field.

As used herein and in the claims a Halbach two pole magnetic field effect is understood to be a magnetization style that allows flux to be concentrated in specific areas around a magnet.

As used herein and in the claims "EMI" is understood to mean ElectroMechanical Interference.

As used herein and in the claims "EMF" is understood to mean ElectroMagnetic Fields.

Figure 1:
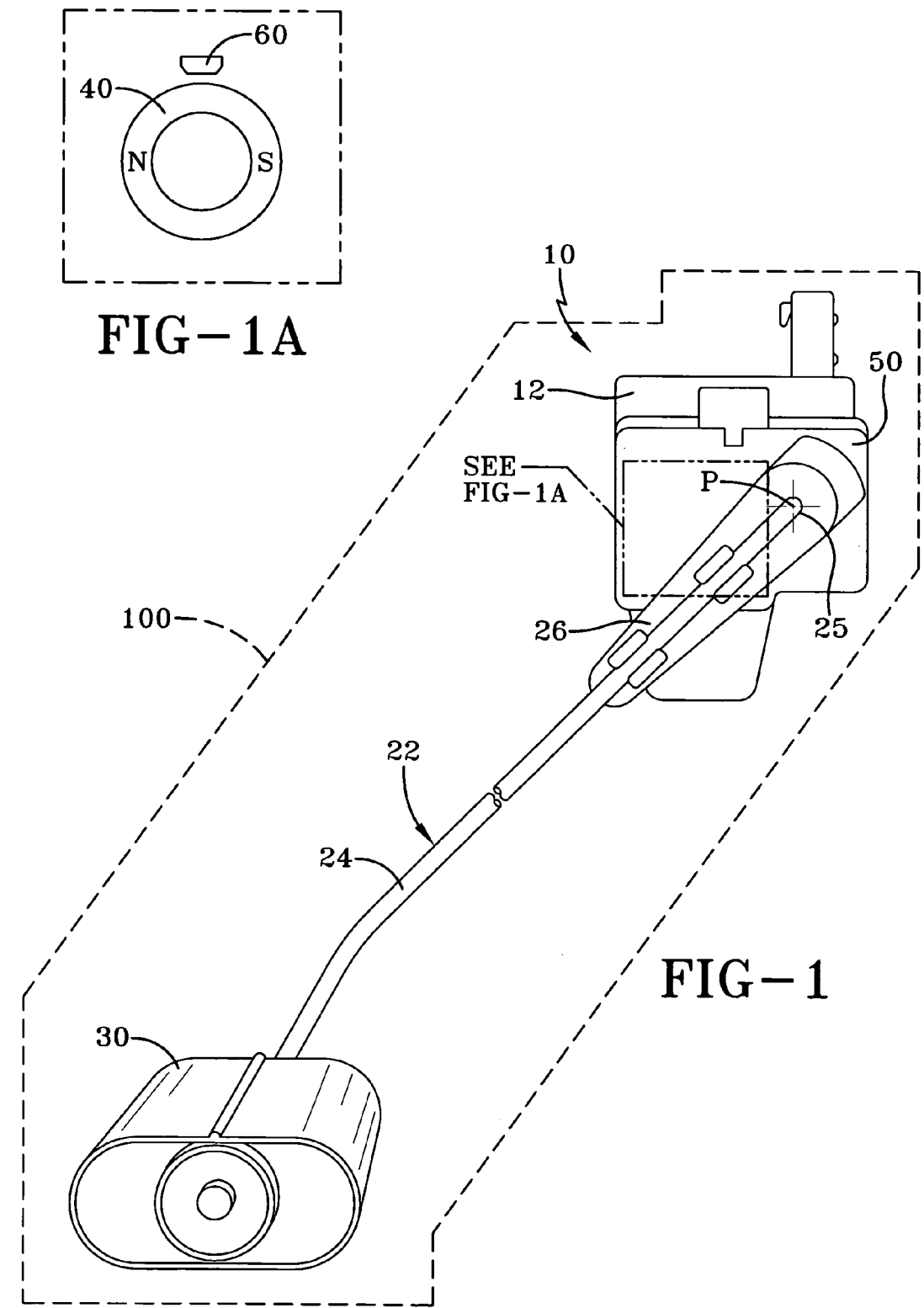
FIG. 1 is a perspective view of a first embodiment of the invention when employed in the fuel tank.

With reference to FIG. 1, a perspective view of a first embodiment of the invention when employed in a fuel tank 100 is illustrated. The sensor assembly 10 is mounted onto a support bracket 12 that is mounted internally of the fuel tank 100. The fuel tank 100 is represented by dashed lines. Extending from the support bracket 12 is a lever arm 22 that is pivotably movable about an axis of rotation or pivot point P. In the example shown, the pivoting motion of the lever arm 22 is accomplished in a movement that extends approximately 90 degrees going from less than the 6 o'clock position to approximately the 9 o'clock position when measuring an angular rotation in terms of a clock face having 12:00 at the top and 6:00 at the bottom. The pivot angle depends on the application e.g. 90°, 60° or any other angle depending on the customer specified requirements. Unlike a motor, the pivotal movement is less than a full 360° revolution typical of electric motors. The lever arm 22 includes a metal rod 24 that extends down to a float 30 that is used to respond to the liquid level in the tank 100. At the first end 25 the rod 24 is snapped into the pivot arm 26, the pivot arm 26 actually rotates about the axis of rotation P. The lever arm 22 is illustrated as a two part component having a rigid metal rod 24 snapped into a plastic pivot arm 26 as illustrated.

Figure 2:
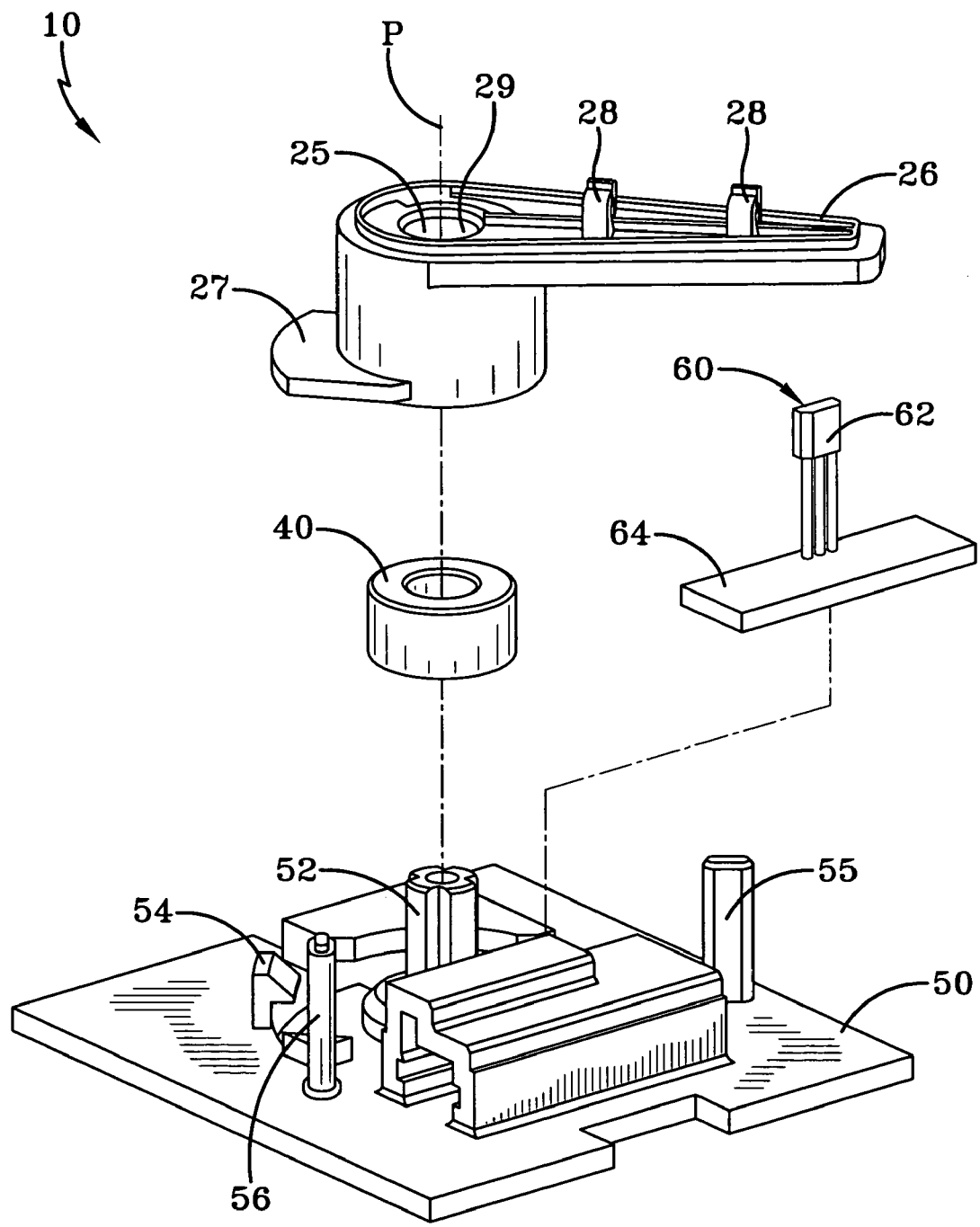
FIG. 2 is an exploded perspective view of the magnetic sensor assembly taken from FIG. 1.

FIG. 2 is an exploded view of the sensor assembly 10. The molded plastic pivot arm 26 surrounds a ring magnet 40; the ring magnet 40 and the pivot arm 26 are mounted over an extending post 52 on a plastic location plate 50 which snaps into the support bracket 12. The pivot arm 26 has a tab 27 that snaps under the clip 54 to secure the assembly. Pivot Stops 55, 56 insure the lever arm assembly cannot over pivot beyond these fixed locations. The pivot rod 24 (not shown) is attached by the two retainers 28 of the pivot arm 26. The first end 25 is located at the hole 29. The location plate 50 further includes a sensor element 60 and a printed circuit board (PCB) 64, the sensor element 60 as illustrated is a Hall element 62. This Hall element 62 is responsive to magnet fields and can detect magnetic fields and changes in the field strength intensity. This is one preferred method used to complete the Hall effect circuit. Others included metal lead frame or injection molded sensor housing with molded in conductive tracks.

The magnet 40 when fitted into the pivot arm 26 is secured or keyed together such that the magnet 40 and the pivot arm 26 move both parts move together in a rotational movement about the axis P. The movement of the ring magnet 40 in proximity to the Hall element 62 creates a shift in the magnetic field that is sensed by the Hall element 62. The Hall element 62 transmits a signal to a microprocessor connected to the PCB 64, which gives an indication of the fill level of the tank 100.

Figure 3A:
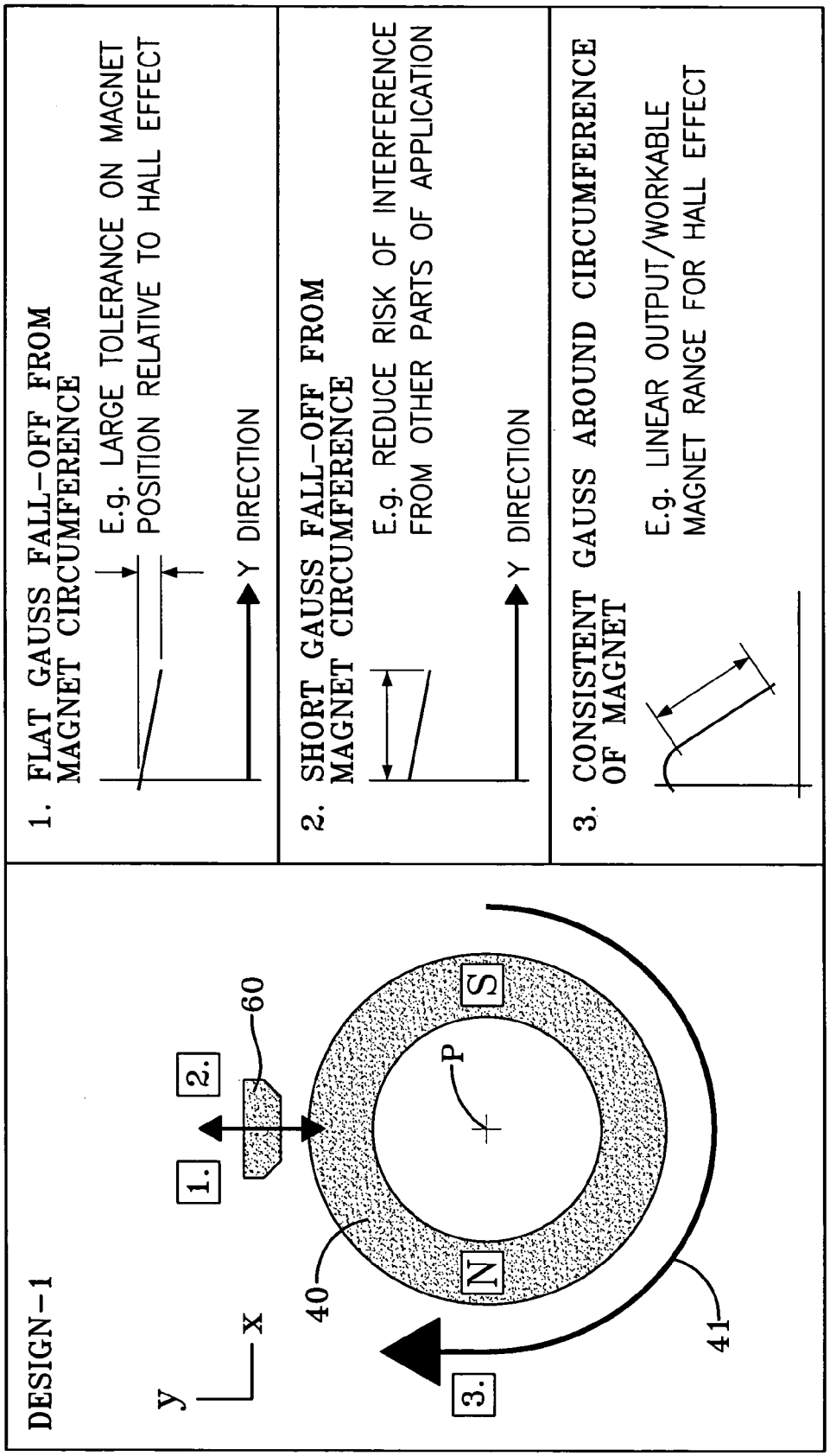
FIG. 3A is an enlarged view of the magnet and magnetic sensor showing its orientation and the poles.
Figure 3B:
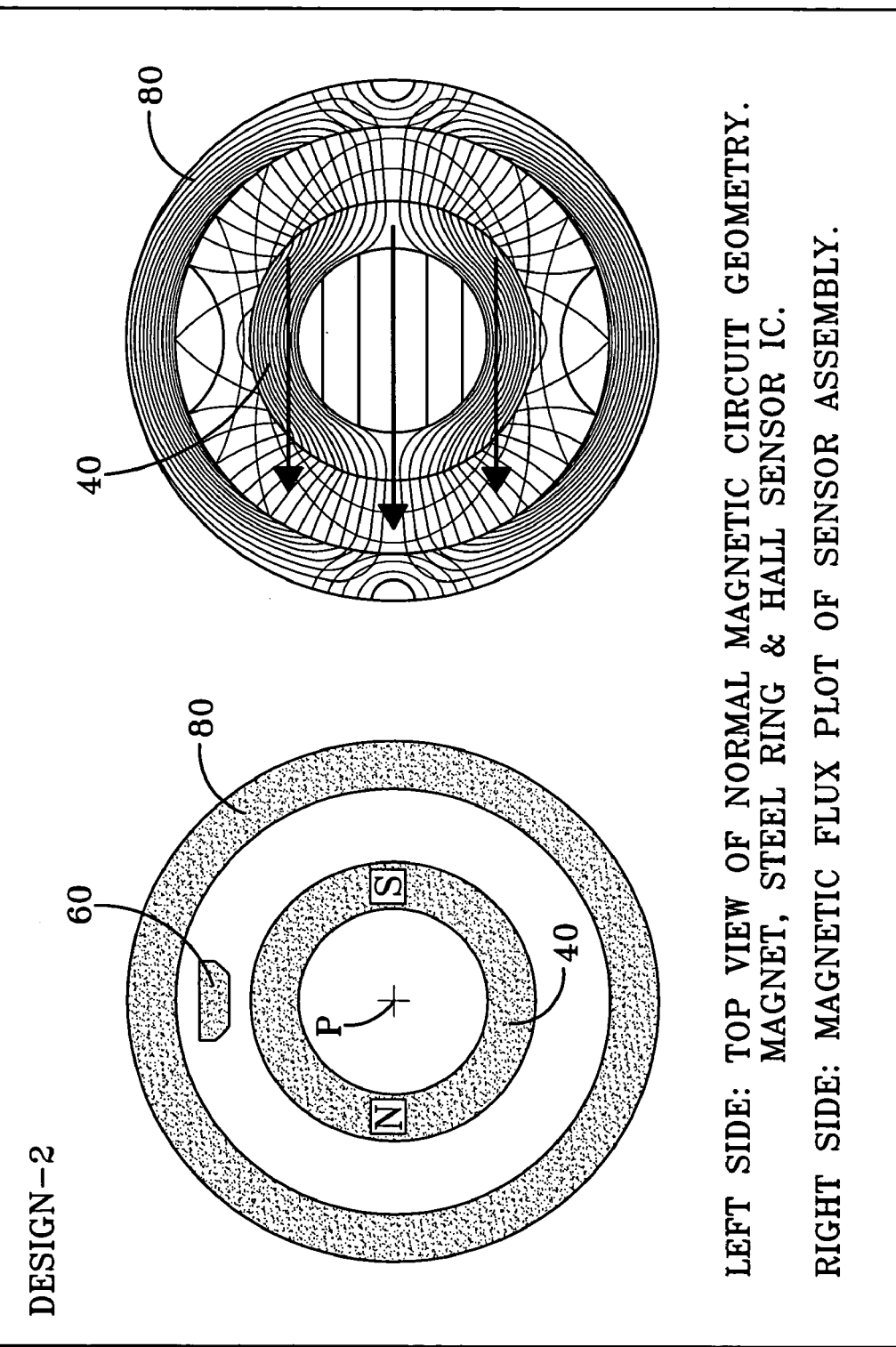
FIG. 3B is a second embodiment of the magnetic sensor and magnet wherein an outer magnetic shield is provided.

With reference to FIGS. 3A, 3B and 3C, three variations of the magnet 40 relative to the magnetic sensor 60 are illustrated. In FIG. 3A, the magnet 40 is shown as a bipolar ring magnet 40 having north and south poles. The ring magnet 40 rotates as illustrated by the directional arrows 41 as the lever arm 22 pivotably moves. The sensor 60 is spaced a fixed distance from the magnet 40 and as the magnet 40 rotates in its predetermined arcuate or circular path, the magnet poles north and south shift relative to the sensor 60. This shift in the magnet poles creates a change in the magnetic field that can be sensed and the location of the shift can be correlated to the corresponding fill level in the tank 100. As a result, measurements of the tank 100 can be done in a non-contacting mode simply by observing the change in the magnetic field relative the sensor 60 as a result of the rotation of the north and south poles. What is unusual about this type of magnetic sensor 60 is that it relies on the predetermined arcuate path of the magnet 40 as it rotates about the fixed axis or pivot point P. While magnetic motors commonly use magnets which are positioned around the entire periphery and an inductive field is created as the motor spins. This use of the rotating magnet 40 is unusual in that the motion is only of a limited value and not of a complete 360 degrees rotation. Accordingly, the magnetic shift can result in movements of less than one quarter of a circle. As a result of the short arcuate path, it is deemed feasible that the magnet 40 itself may be of only a short arcuate portion and does not require a full annular ring as illustrated. The magnet can alternatively be made of a plurality of magnets creating a variety of fields wherein many magnets can have a particular magnetic field signature if properly positioned around a circular arc and the sensor 60 will be able to detect changes in that field as the magnet 40 rotates. These combinations are possible with the use of the magnetic sensor 60 and the magnet 40 as illustrated in FIGS. 3A, 3B and 3C. In FIG. 3A the magnetic sensor 60 is located external or outward of the magnet 40 relative to the pivot point P. With reference to the graphs 1, 2, 3 of FIG. 3A, each graph shows a specific requirement for successful Hall effect magnetic sensing applications. These requirements apply to each of the design embodiments discussed. As shown at 1, the magnet gauss should be stable moving out from the center. This helps were the mechanical tolerance means that the Hall effect position relative to the magnet may vary. As shown at 2, the magnet gauss should not be too strong. This reduces the risk of it being affected by external fields. Finally at part 3, the magnet gauss should produce consistent output around the circumference. The larger this is the better the linear output from the Hall effect will be.

With reference to FIG. 3B, in addition to the magnet 40 and the magnetic sensor 60 a shield ring 80 has been superimposed and encircles both the sensor 60 and the magnet 40. In this embodiment, the shielding helps prevent EMI and EMF noise from interfering with the ability of the magnetic sensor 60 to detect the magnetic field and eliminate stray magnetic fields from influencing the measurement accuracy. While this embodiment provides a level of shielding, it does require an additional component.

With reference to FIG. 3C, it is feasible that the entire sensor 60 is positioned inside an annular ring magnet 40 as illustrated. In such a case it provides its own internal shielding such that the magnetic field being measured is shielded from extraneous noise due to the fact that the sensor 60 is internal to the magnet 40 and accordingly is isolated from EMI and EMF issues.

This embodiment takes advantage of the inner-Halbach 2 pole magnetic field effect. In this case the inside of the ring magnet produces increased flux and the outside (around the outer diameter) produces a minimum amount. As shown the sensor may be offset from the center P of the magnet 40, however, it is believed the sensor 60 being at or nearer to the center P is preferable.

Figure 4:
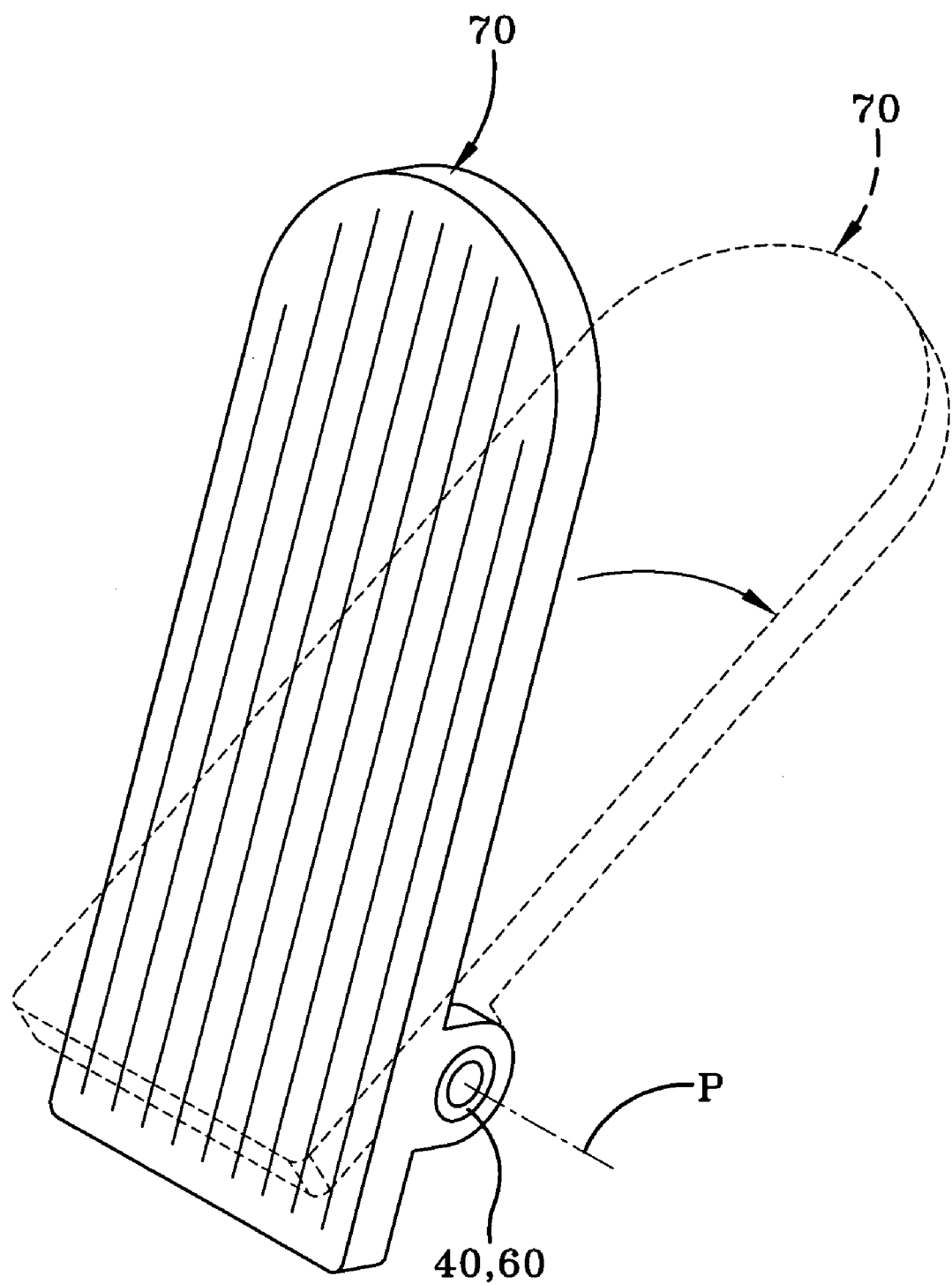
FIG. 4 is a perspective view of an accelerator throttle pedal employing the magnetic sensor assembly of the present invention.

FIG. 4 is a perspective view of an accelerator throttle pedal 70 employing a magnetic sensor assembly. This foot pedal 70 as shown pivots about an axis of rotation P as earlier described. The embodiments of FIGS. 3A–3C can be employed by simply mounting the sensor 60 and magnet 40 about the axis of the pivot point P in the throttle 70. In practice, to accelerate the magnetic field will be rotated in such a fashion that the sensor 60 will detect the rotation and signal a microprocessor which will then request an acceleration of the vehicle through either internal combustion engine or electric motors or any combination thereof to provide propulsion for the vehicle. This use of the sensor 60 and rotating magnet 40 provides a highly reliable, contact free method for achieving vehicle throttle control.

As illustrated, the magnetic sensor assembly 10 may be used in fuel tank 100 applications and in throttle pedal 70 applications. The magnetic sensor assembly 10 as illustrated is suitable in any application where a pivotal motion is generated by the movement of a lever arm 22 whether it be a brake pedal, an accelerator throttle, or any other mechanism wherein a partial rotation about an axis is used. What is advantageous about the present invention is that motions of less than 90 degrees provide more than adequate measuring capability and much finer angular deviations can be sensed such that limited, very small movements of the mechanism can be detected.

It is to be understood that the present invention is not limited to the details of any one embodiment in any one figure, but are defined by the appended claims. The scope of the appended claims should be interpreted to encompass all such modifications, similar arrangements and procedures.

I claim:

1. A magnetic sensor assembly for measuring changes in the position of a lever arm comprising:
    a support;
    a lever arm pivotably movable about an axis of rotation or a pivot point and being attached to the support at a first end of the lever arm;
    an annular ring bi-polar magnet producing an inner-Halbach 2 pole magnetic field effect having an increased flux internal of the annular ring bi-polar magnet and a minimum external flux outside the magnet, the magnetic field being adjacent to the first end of the lever arm and fixed to rotate in a predetermined arc about the pivot point or axis of rotation in response to a pivotal movement of the lever arm; and
    a magnetic sensor positioned in proximity to the magnet detects changes in the magnetic field due to rotation of the magnet along a predetermined arc wherein the predetermined arc has a constant radius of curvature forming a circular arc, and wherein the magnetic sensor is a Hall element positioned internal relative to the arc radius of curvature, thereby shielding the sensed magnetic field internal of the magnet from extraneous EMI or EMF noise.

2. A magnet sensor assembly according to claim 1 wherein the annular ring bipolar magnet and the magnetic sensor are positioned approximately equidistant to the poles in a null position.

3. A magnetic sensor assembly according to claim 1 further comprising a float attached to the opposite end of the lever arm and wherein the magnetic sensor assembly is a fluid measuring device for a fluid storage tank.

4. A magnetic sensor assembly according to claim 3 wherein the fluid storage tank is a fuel tank for a vehicle.

5. A magnetic sensor assembly according to claim 1 further comprising an accelerator throttle pedal for a vehicle and wherein the magnetic sensor assembly measures the movement of the accelerator throttle pedal to control vehicle acceleration.

6. The magnetic sensor assembly of claim 2 wherein the annular ring bi-polar magnet has a center P, and the sensor is positioned offset from the center P.

7. The magnetic sensor assembly of claim 2 wherein the annular ring bi-polar magnet has a center P, and the sensor is positioned at or near P.

8. The sensor assembly of claim 1 wherein the sensor provides a contactless measurement of fine angular movements of the magnet within an arc or rotation 90° or less.

\* \* \* \* \*